(12) United States Patent
Hayslett et al.

(10) Patent No.: US 9,636,613 B2
(45) Date of Patent: May 2, 2017

(54) PORTABLE WATER BOTTLE ASSEMBLY HAVING A REPLACEABLE FILTER CARTRIDGE

(71) Applicant: Liquidity Corporation, Alameda, CA (US)

(72) Inventors: David Hayslett, Campbell, CA (US); Tomás Colussi, Oakland, CA (US); Michael Hawes, Orinda, CA (US)

(73) Assignee: Liquidity Corporation, Alameda, CA (US)

( * ) Notice: Subject to any disclaimer, the term of this patent is extended or adjusted under 35 U.S.C. 154(b) by 133 days.

(21) Appl. No.: 14/750,251

(22) Filed: Jun. 25, 2015

(65) Prior Publication Data

US 2016/0251234 A1    Sep. 1, 2016

Related U.S. Application Data

(60) Provisional application No. 62/121,605, filed on Feb. 27, 2015.

(51) Int. Cl.

| | |
|---|---|
| *C02F 1/00* | (2006.01) |
| *B01D 39/14* | (2006.01) |
| *B01D 29/35* | (2006.01) |
| *B01D 39/16* | (2006.01) |
| *B01D 39/20* | (2006.01) |
| *B01D 71/42* | (2006.01) |

(Continued)

(52) U.S. Cl.
CPC ........... *B01D 39/14* (2013.01); *B01D 29/353* (2013.01); *B01D 39/163* (2013.01); *B01D 39/1623* (2013.01); *B01D 39/1692* (2013.01); *B01D 39/2017* (2013.01); *B01D 71/42* (2013.01); *C02F 1/002* (2013.01); *C02F 1/44* (2013.01); *B01D 2239/025* (2013.01); *B01D 2239/0442* (2013.01); *B01D 2239/065* (2013.01); *B01D 2239/1233* (2013.01); *C02F 2101/12* (2013.01); *C02F 2303/04* (2013.01); *C02F 2307/02* (2013.01)

(58) Field of Classification Search
CPC ....... C02F 1/002; C02F 1/003; C02F 2307/02
See application file for complete search history.

(56) References Cited

U.S. PATENT DOCUMENTS 3,335,917 A * 8/1967 Knight ..................... A45F 3/16
                                                              210/453
5,601,199 A * 2/1997 Marty ..................... A61J 9/00
                                                              215/11.1

(Continued)

*Primary Examiner* — Matthew O Savage
(74) *Attorney, Agent, or Firm* — Locke Lord LLP; Scott D. Wofsy

(57) ABSTRACT

A portable bottle for filtering drinking water is disclosed that includes a bottle having a threaded opening, a cover for cooperating with the threaded opening of the bottle and including a top wall having a plurality of internal engagement lugs depending downwardly from an interior surface of the top wall, a filter cartridge including an end cap having a circumferential side wall that includes a plurality of engagement ribs for cooperating with the engagement lugs of the cover, and a spout including a compressible circumferential flange configured to be positioned between the interior surface of the top wall of the cover and the upper surface the end cap of the filter cartridge to provide a resilient biasing force therebetween.

20 Claims, 9 Drawing Sheets

(51) Int. Cl.
*C02F 1/44* (2006.01)
*C02F 101/12* (2006.01)

(56) References Cited

U.S. PATENT DOCUMENTS

| | | | | |
|---|---|---|---|---|
| 5,609,759 A | * | 3/1997 | Nohren, Jr. | C02F 1/003 210/266 |
| 6,136,189 A | * | 10/2000 | Smith | C02F 1/002 210/266 |
| 6,569,329 B1 | | 5/2003 | Nohren, Jr. | |
| 2008/0121583 A1 | * | 5/2008 | Nohren | C02F 1/002 210/466 |

* cited by examiner

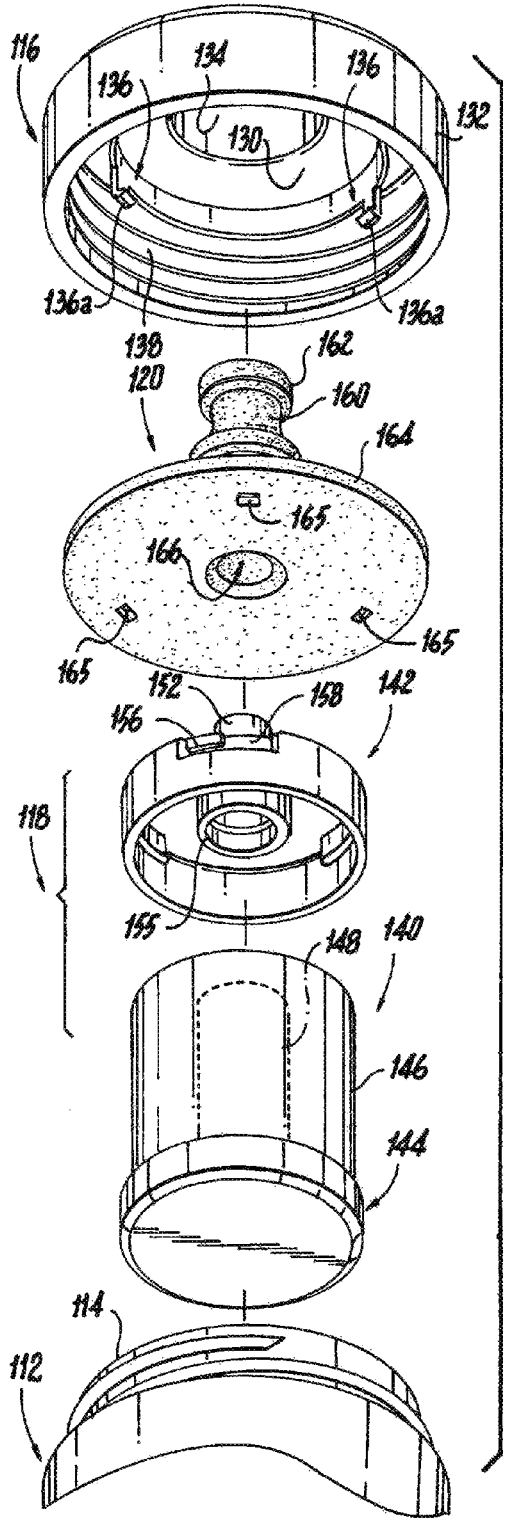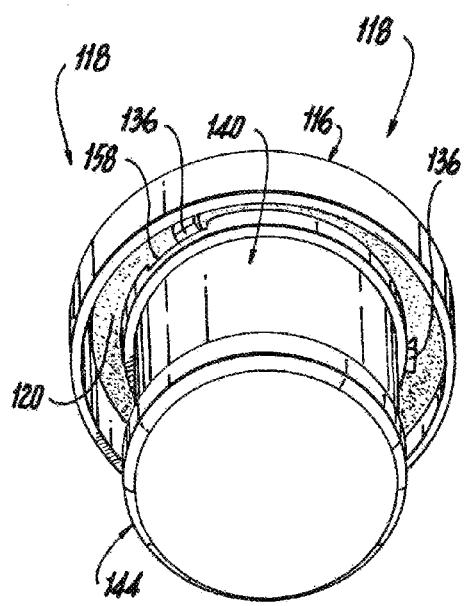
Fig. 13
Fig. 12

PORTABLE WATER BOTTLE ASSEMBLY HAVING A REPLACEABLE FILTER CARTRIDGE

CROSS-REFERENCE TO RELATED APPLICATION

The subject invention claims the benefit of priority from U.S. Provisional Patent Application Ser. No. 62/121,605, filed Feb. 27, 2015, the disclosure of which is incorporated herein by reference in its entirety.

BACKGROUND OF THE INVENTION

1. Field of the Invention

The subject invention is directed to fluid filtration, and more particularly, to a portable water bottle assembly having a having a replaceable filter cartridge associated therewith for filtering and dispensing drinking water.

2. Description of Related Art

Drinking water in many areas of the world contains dissolved chemicals and suspended particulate material, as a consequence of run-off and environmental contamination. Some of these chemicals and particulates have been associated with adverse physiological effects. Others have been associated with less than desirable taste and sensory perceptions.

To reduce particulate and chemical contamination, drinking water is frequently treated by chemical processes. However, these processes may introduce other types of undesirable chemical contaminants into the water. Chemicals, such as bromine and chlorine, are also frequently added to water to act as a sanitizing agent. The dangers associated with these chemicals have been questioned.

There is a general view that municipal water treatment plants often fail to adequately deal with these problems. To improve water quality, many residences and businesses now employ on-site water filters to improve water streams consumed therein.

Most systems for improving water quality use a series of filters. Filtration is the process of separating particles from a fluid suspension by use of a porous medium or by means of a medium possessing chemical properties, such as hydrophobicity, electrostatic charge, etc., which permit the medium to interact with and hold the particles to be separated from the fluid, while permitting the fluid to pass there through.

Chemical contaminants are often removed by filters through chemical absorption into, or adsorption onto, the surface of the filter medium. Optimally, it is desired that the filter medium retains most of the suspended particles and many of the chemical contaminants, but allows the fluid being filtered to pass through unimpeded. Flow across the filter medium is generally achieved by the application of a driving force, usually in the form of a pressure difference across the filter, which may be generated by external pressure applied upstream, a vacuum applied downstream, gravity, or another force.

Fluid filters are often constructed in the form of relatively rigid replaceable filter units or filter cartridges. Filter cartridges often employ granular activated carbon elements in their construct. Granular activated carbon is useful for removing organic chemicals such as chlorine, hydrogen sulfide, pesticides, herbicides, phenol, chlorophenol and hydrocarbon from water. Other filter elements may be employed in the cartridge construct to help, for example, to remove sediments such as rust and other particles. Silver is sometimes impregnated into one or more filter element to inhibit bacterial growth. Ion exchange resins may also be employed.

While filter cartridges containing granular activated carbon are known to be good at removing contaminants that affect taste, odor of the filtrate, and visible particulate matter, such filter cartridges generally are not fine enough to remove bacteria or viruses. Water may be contaminated with a number of micro-organisms including pathogenic bacteria, amoebae, flagellates, viruses and protozoa. In fact, as some water remains inside carbon granules after filtration, stagnant water in the carbon granules may act as a breeding ground for micro-organisms. Therefore, water discharged after a long period of non-use of a carbon-based filter cartridge may be contaminated with living organisms.

Recognizing that prior art filter cartridges which incorporate only a single filter medium, in particular a carbonaceous medium, suffer from the inability to remove many of the contaminants found in water, there have been developed filter assemblies employing a plurality of filter media. For example, filter assemblies have been developed that include an outer cylindrical filter structure with porosity to remove particulate matter, an inner cylindrical sorbent structure for sorbing chemical contaminants, and an inner-most cylindrical microbiological filter, preferably comprising a microporous membrane or a microporous fiber bundle for removing microorganisms. By moving water through the assembly, from the outer structure to the inner structure, particulates are removed, chemicals are adsorbed or absorbed, and microorganisms are filtered out.

There is a need in the art for a portable water bottle with a replaceable filter cartridge that is adapted to remove contaminants and particulate matter, as well as, bacteria and, optionally, viruses from drinking water. The subject invention fulfills that need.

SUMMARY OF THE INVENTION

The subject invention is directed to a new and useful portable water bottle assembly for filtering drinking water, and more particularly, to a portable water bottle assembly having a replaceable filter cartridge that is adapted to remove contaminants and particulate matter, as well as, bacteria and, optionally, viruses from drinking water.

In one embodiment of the subject invention, the portable water bottle assembly includes a bottle having an opening, a cover for the opening of the bottle including a top wall having a plurality of engagement lugs depending downwardly therefrom, a filter cartridge including an end cap having a circumferential side wall that includes a plurality of engagement ribs for cooperating with the engagement lugs of the cover, and a compressible flange positioned between the top wall of the cover and the end cap of the filter cartridge to provide a resilient biasing force therebetween that promotes the cooperative retention of the engagement lugs and engagement ribs.

In another embodiment of the subject invention, the portable water bottle assembly includes a bottle having a threaded opening, a cover for cooperating with the threaded opening of the bottle and including a top wall having a plurality of circumferentially spaced apart internal engagement lugs depending downwardly from an interior surface of the top wall, a replaceable filter cartridge including an end cap having a circumferential side wall that includes a plurality of circumferentially spaced apart engagement ribs for cooperating with the circumferentially spaced apart engagement lugs of the cover. The assembly further includes a spout having a compressible circumferential flange configured to be positioned between the interior surface of the top wall of the cover and the upper surface the end cap of the filter cartridge to provide a resilient biasing force therebetween.

The subject invention is also directed to a portable water bottle assembly for filtering and dispensing drinking water that includes, among other things, a bottle having an externally threaded opening, a cover for cooperating with the externally threaded opening of the bottle and including a top wall and a circumferential side wall. The top wall of the cover has a central aperture formed therein and a plurality of circumferentially spaced apart internal engagement lugs depending downwardly from an interior surface of the top wall, the circumferential side wall of the cover having an interior thread formed therein for cooperating with the externally threaded opening of the bottle.

The water bottle assembly further includes a replaceable filter cartridge including a cylindrical filter element and an end cap. The filter element having an outer periphery and an axial inner bore, the end cap of the filter cartridge having an upper surface with an upwardly extending central outlet sleeve communicating with the inner bore of the filter element and a circumferential side wall having a plurality of circumferentially spaced apart engagement ribs for cooperating with the circumferentially spaced apart engagement lugs of the cover.

The assembly also includes a spout having a nipple configured to extend through the central aperture in the cover and adapted to receive the outlet sleeve of the end cap of the filter cartridge. The spout further includes a compressible circumferential flange surrounding the nipple and configured to be positioned between the interior surface of the top wall of the cover and the upper surface the end cap of the filter cartridge to provide a resilient biasing force therebetween. This biasing force promotes the cooperative retention of the engagement lugs of the cover below the engagement ribs of the end cap.

Preferably, each engagement lug has a radially inwardly facing tang for engagement below a corresponding one of the engagement ribs, and each of the circumferentially spaced apart engagement ribs resides within an arcuate recess formed in the end cap of the filter cartridge. In one embodiment of the subject invention, the engagement lugs extend through corresponding apertures formed in the circumferential flange of the spout.

In an embodiment of the subject invention, the filter cartridge includes a multi-layered pleated filter element having at least one pre-filtration layer, a bacteria retention layer made of an electrospun nanofiber membrane, and a carbon block core disposed within an inner peripheral region of the pleated filter element. The filter element is preferably adapted to remove contaminants and particulate matter, as well as, bacteria and, optionally, viruses from drinking water.

These and other features of the portable water bottle assembly of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the water bottle assembly of the subject invention without undue experimentation, preferred embodiments thereof will be described in detail herein below with reference to certain figures, wherein:

FIG. 12 is an exploded perspective view of the assembly shown in in FIG. 11, with parts separated for ease of illustration;

FIG. 13 is a perspective view of the bottle cover and filter cartridge shown in FIG. 12, but viewed from below.

DETAILED DESCRIPTION OF PREFERRED EMBODIMENTS

Figure 1:
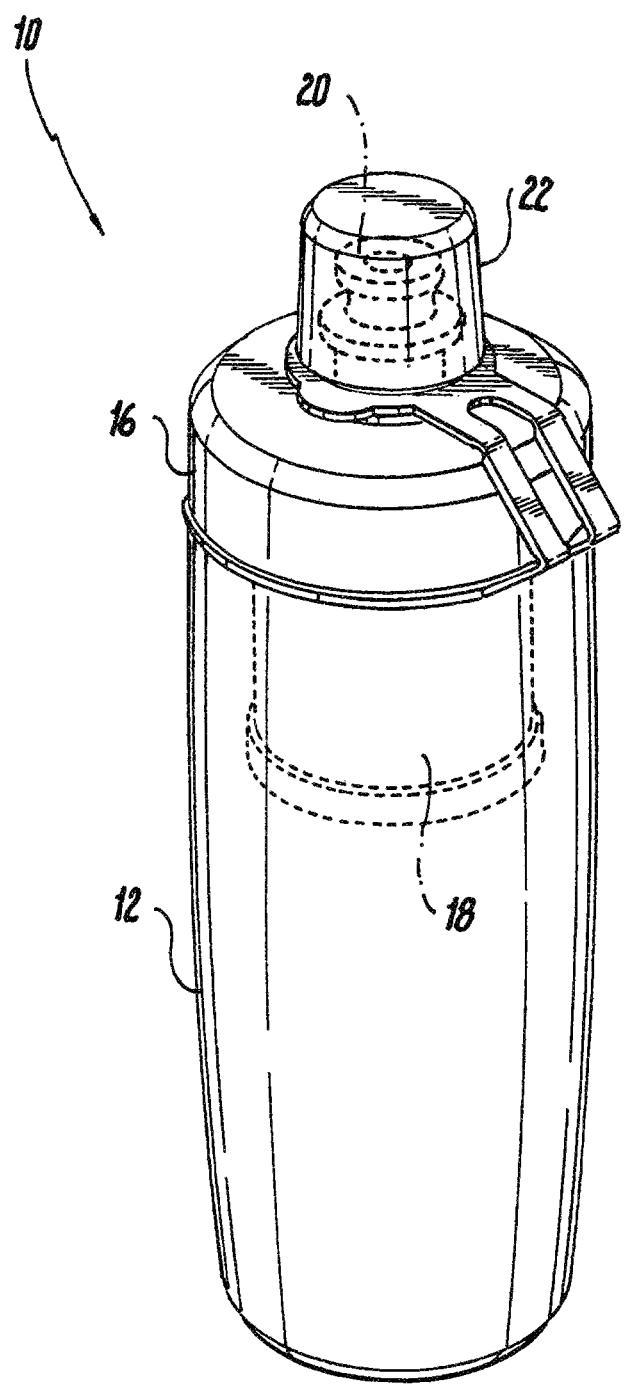
FIG. 1 is a perspective view of a portable water bottle assembly having a replaceable filter cartridge therein, which is constructed in accordance with a preferred embodiment of the subject invention.

Referring now to the drawings, wherein like reference numerals identify similar structural features or aspects of the subject invention, there is illustrated in FIG. 1 a portable water bottle assembly having a replaceable filter cartridge, which is constructed in accordance with a preferred embodiment of the subject invention and designated generally by reference numeral 10.

Figure 2:
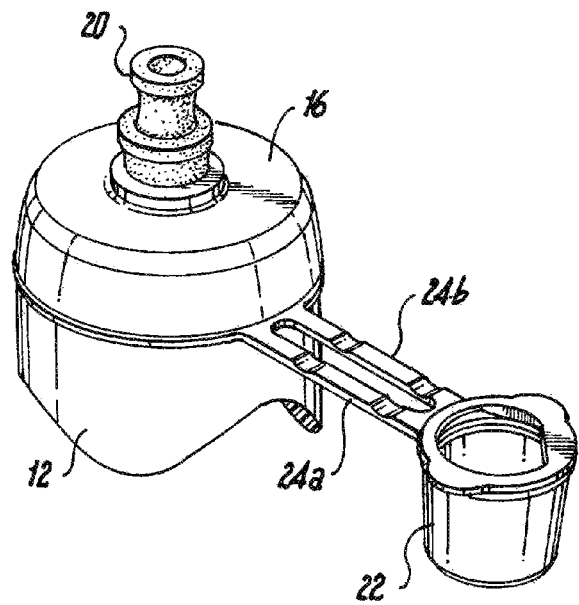
FIG. 2 is a perspective view of the upper portion of the portable water bottle assembly with the tethered cap removed from the spout.
Figure 3:
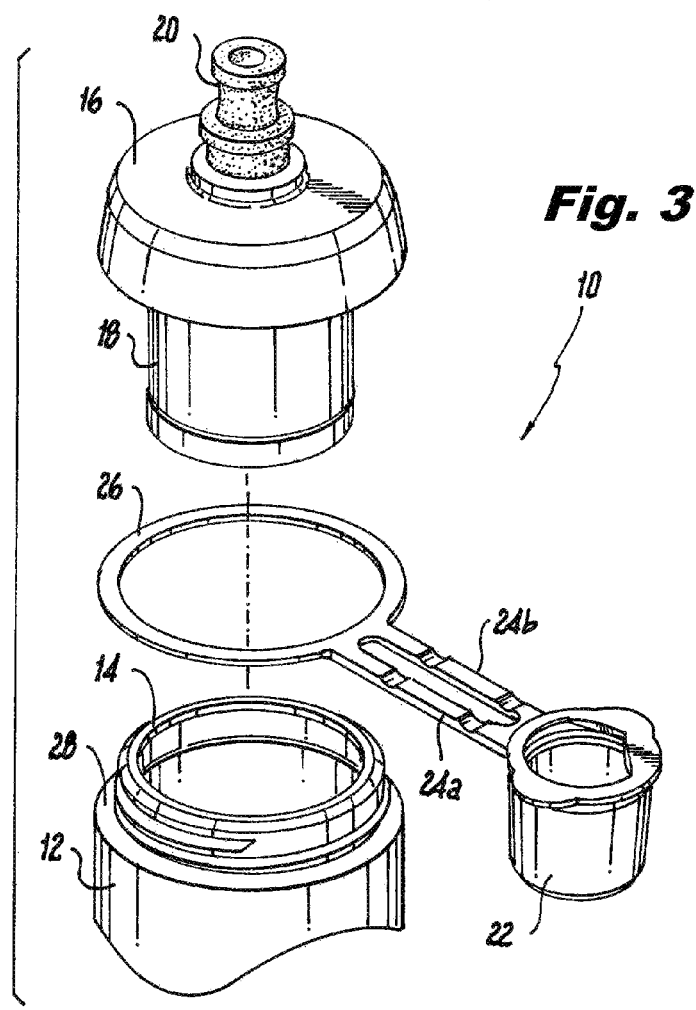
FIG. 3 is a perspective view of a portable water bottle assembly, with the cover and filter cartridge separated from the top of the bottle.

Referring to FIGS. 1 through 3, the water bottle assembly 10 of the subject invention includes a generally cylindrical flexible water bottle 12 made from a light weight plastic material, such as, for example, polypropylene or a similar food grade polymeric material. The bottle 12 has an externally threaded opening 14, which is best seen in FIG. 3. The assembly 10 further includes a cover 16 for cooperating with the externally threaded opening 14 of the bottle 12, a replaceable filter cartridge 18 that fits within the opening 14 of bottle 12 and cooperates with the cover 16, and a drinking spout 20 that is in fluid communication with the filter cartridge 18. In use, when the water bottle 12 is squeezed, the unfiltered water contained therein water is forced through the filter cartridge 18 and then out from the spout 20.

A tethered cap 22 is operatively associated with the spout 20. The cap 22 is connected by a pair of flexible struts 24a and 24b to a gasket ring 26. The gasket ring 26 is seated on a circumferential ledge 28 of bottle 12, below the threaded opening 14. As best seen in FIGS. 1 and 2, when the cover 16 is threadably associated with the bottle 12, the gasket ring 26 is firmly secured between the cover 16 and the ledge 28 of the bottle 12.

Figure 4:
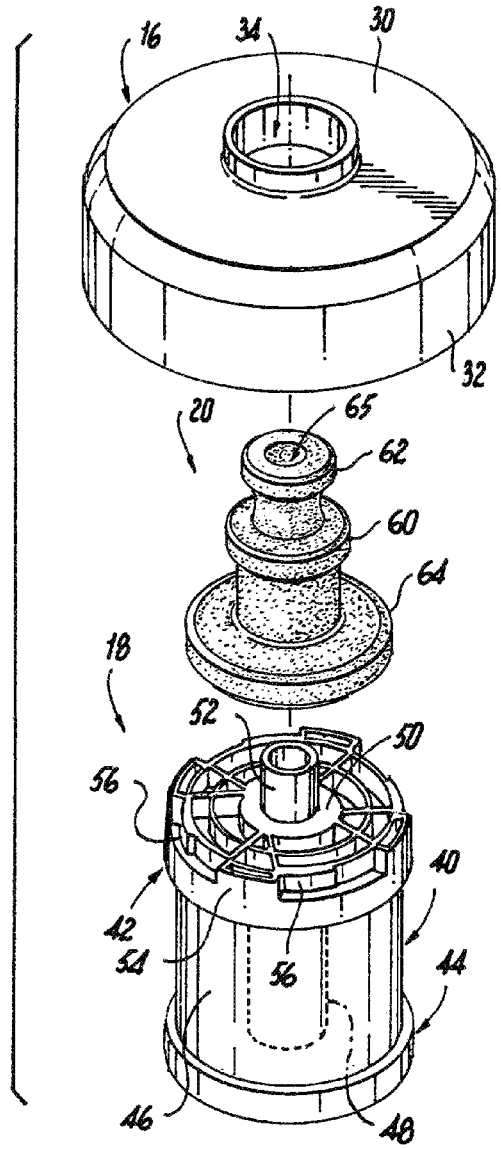
FIG. 4 is a perspective view of the bottle cover, drinking spout and filter cartridge separated from one another and shown from above for ease of illustration.
Figure 5:
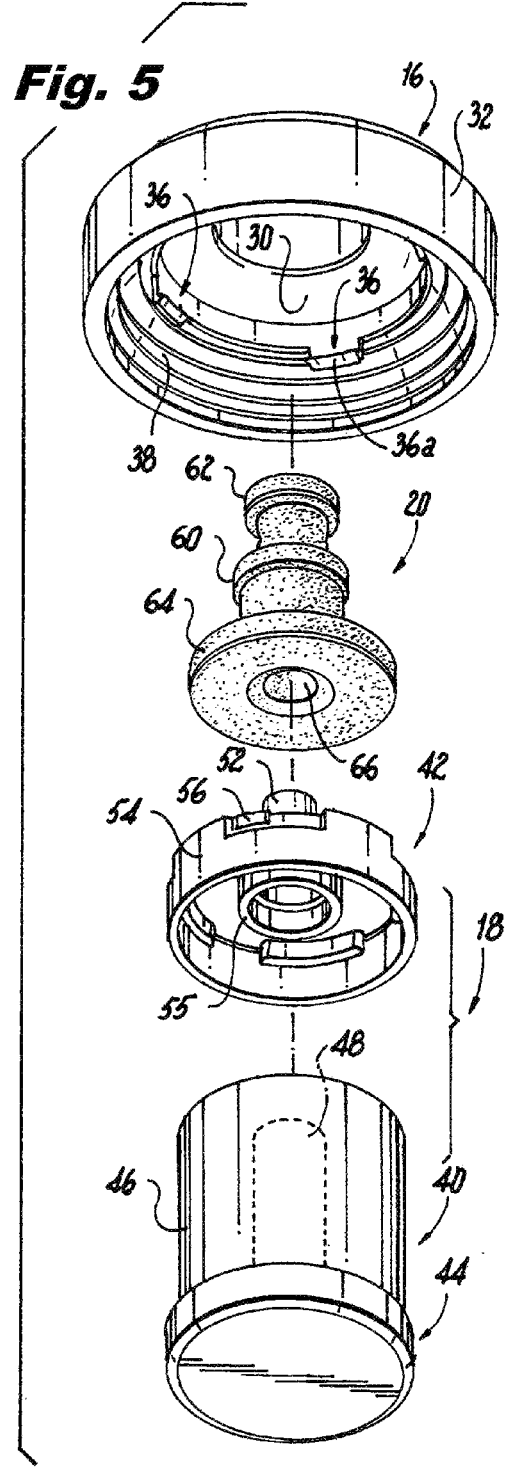
FIG. 5 is a perspective view of the bottle cover, drinking spout and filter cartridge separated from one another and shown from below, with the end cap or the filter cartridge removed for ease of illustration.
Figure 6:
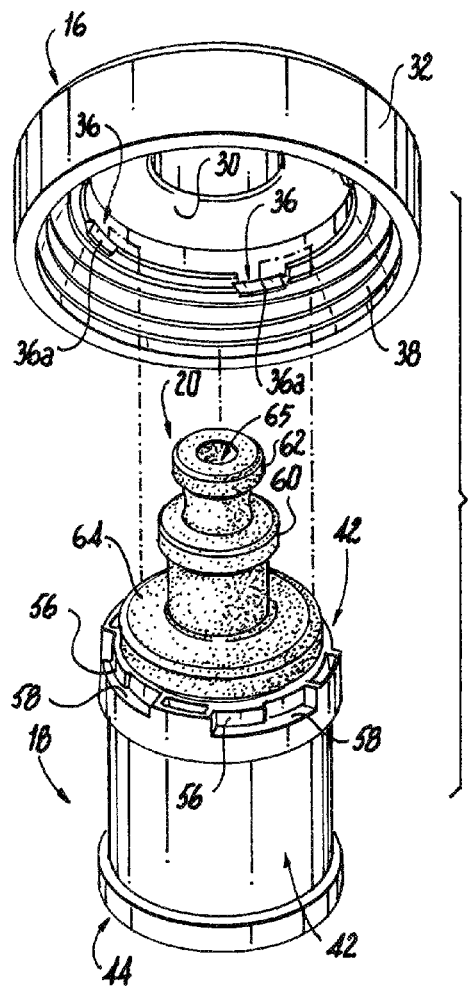
FIG. 6 is a perspective view of the bottle cover shown from below, with the drinking spout joined to the filter cartridge, which is shown from above.

Referring now to FIGS. 4 through 6, the cover 16 of assembly 10 includes a top wall 30 and a circumferential side wall 32. The top wall 30 of the cover 16 has a central aperture 34 formed therein. In addition, a plurality of circumferentially spaced apart internal engagement lugs 36 depending downwardly from an interior surface of the top wall 30. The circumferential side wall 32 of the cover 16 has an interior thread 38 formed therein for cooperating with the externally threaded opening 14 of the bottle 12.

The replaceable filter cartridge 18 includes a cylindrical filter element 40 and an upper end cap 42 and a lower end cap 44. The filter element 40 has an outer periphery 46 and an axial inner bore 48. It is envisioned that a mesh wrap or perforated cage (not shown) could enclose the outer periphery 46 of the filter element 40. In an embodiment of the subject invention, the filter element 40 can include a multi-layered pleated filter element having at least one pre-filtration layer, a bacteria retention layer made of an electrospun nanofiber membrane, and a carbon block core disposed within an inner peripheral region of the pleated filter element. The filter element 40 is preferably adapted to remove contaminants and particulate matter, as well as, bacteria and, optionally, viruses from drinking water.

The upper end cap 42 of filter cartridge 18 has an upper surface 50 with an upwardly extending central outlet sleeve 52 that communicates with the spout 20 and downwardly extending inlet sleeve 55 that communicates with the inner bore 48 of the filter element 40 (see FIG. 5). The upper end cap 42 further includes a circumferential side wall 54 having a plurality of circumferentially spaced apart engagement ribs 56 for cooperating with the circumferentially spaced apart engagement lugs 36 of the cover 16. This cooperation will be described in more detail below with respect to FIGS. 7 through 10.

With continuing reference to FIGS. 4 through 6, the spout 20 of assembly 10 is preferably formed from a resilient material, such as rubber or a similar elastomeric material. The spout 20 includes a body portion 60 with an upper nipple section 62 having an outlet port 65, and a circumferential flange portion 64 surrounding the medial body portion 60. The body portion 60 of spout 20 has a central bore 66 for receiving and accommodating the central outlet sleeve 52 of the upper end cap 42 of filter cartridge 18 (see FIG. 5). The body portion 60 with its upper nipple section 62 extends through the central aperture 34 in the cover 16.

The flange portion 64 of spout 20 is compressible and it is adapted and configured to be positioned between the interior surface of the top wall 30 of the cover 16 and the upper surface 50 of the upper end cap 42 of the filter cartridge 18 to provide a resilient biasing force therebetween. As explained in more detail below with reference to FIGS. 7 through 10, this resilient biasing force promotes the cooperative retention of the circumferentially spaced apart engagement lugs 36 of the cover 16 below the circumferentially spaced apart engagement ribs 56 of the upper end cap 42 of filter cartridge 18.

As best seen in FIGS. 5 and 6, each of the circumferentially spaced apart engagement lugs 36 that depend from the top wall 30 of the cover 16 has a radially inwardly facing tang 36a for engagement below a corresponding one of the engagement ribs 56. Furthermore, as best seen in FIGS. 4 and 6, each of the circumferentially spaced apart engagement ribs 56 formed within the upper surface 50 of the upper end cap 42 of filter cartridge 18 resides within an arcuate recess 58 formed in the upper surface 50 of upper end cap 42.

Figure 7:
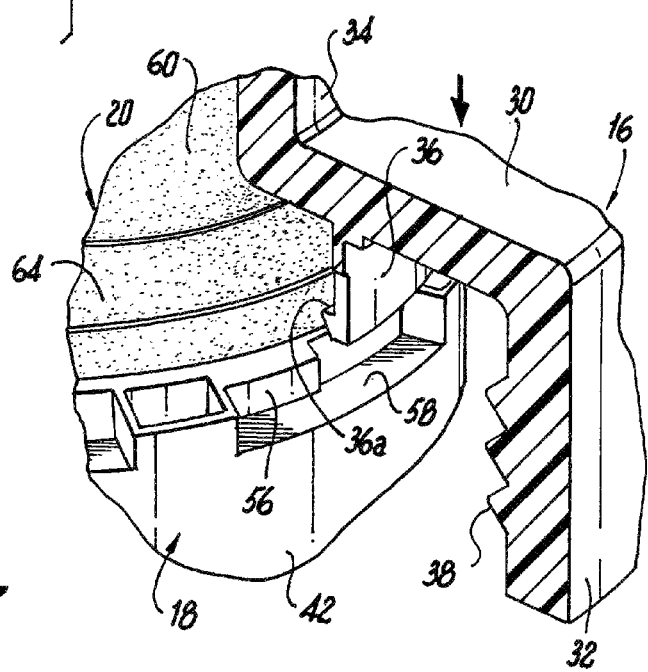
FIGS. 7 through 10 are localized perspective cutaway views of the bottle cover of the water bottle assembly of FIG. 1, illustrating the cooperative interaction between one of the engagement lugs depending from the top wall of the bottle cover and a corresponding rib formed in the peripheral edge of the end cap of the filter cartridge.

Referring now to FIGS. 7 through 10, there is illustrated the sequential steps for securing the replaceable filter cartridge 18 to the cover 16 of the assembly 10. First, as shown in FIG. 7, the body portion 60 of spout 20 is inserted through the central aperture 34 in the top wall 30 of cover 16 so that the circumferentially spaced apart engagement lugs 36 are positioned with corresponding arcuate access areas 58 formed in the upper surface 50 of the upper end cap 42 of cartridge 18.

Figure 8:
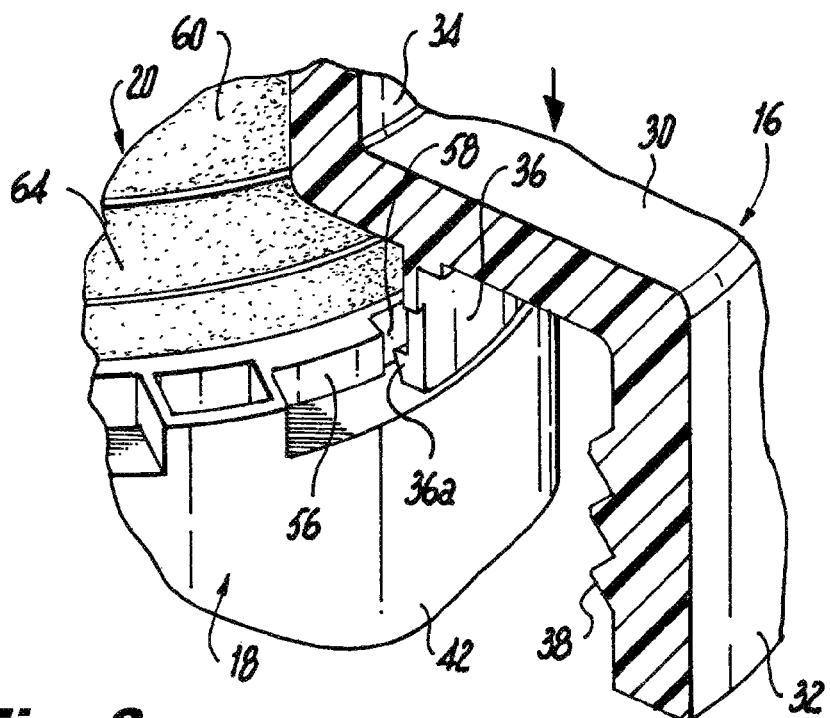
Figure 9:
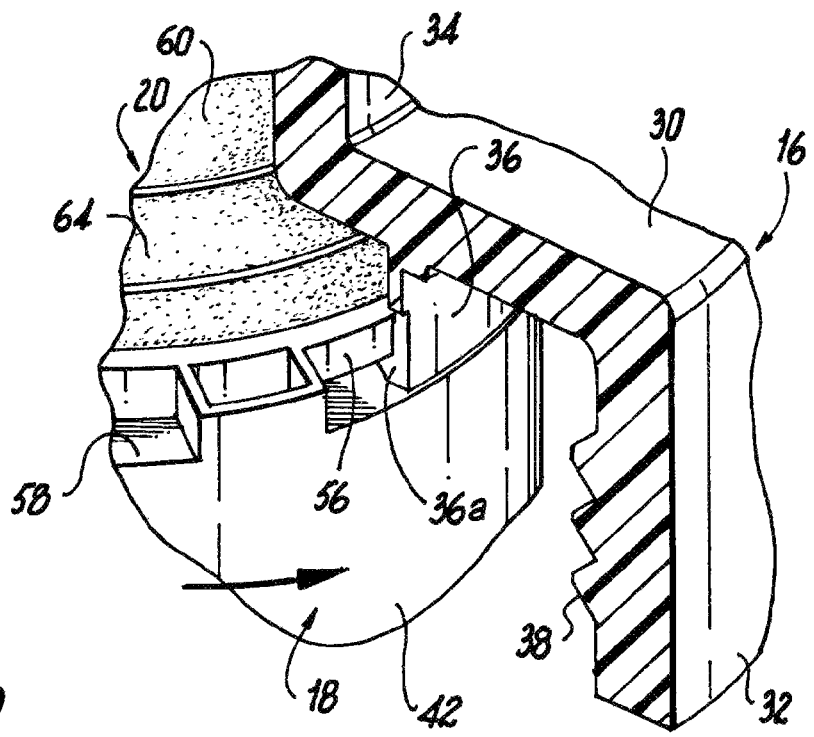

Then, as shown in FIG. 8, a downward force is exerted on the cover 16 to compress the flange portion 64 of spout 20 between the interior surface of the top wall 30 of the cover 16 and the upper surface 50 of the upper end cap 42 of the filter cartridge 18. Thereafter, as shown in FIG. 9, the filter cartridge 18 is rotated in a counter-clockwise direction relative to the cover 16 (or vice versa) so that the radially inwardly facing tangs 36a of the circumferentially spaced apart engagement lugs 36 travel below the corresponding engagement ribs 56.

Figure 10:
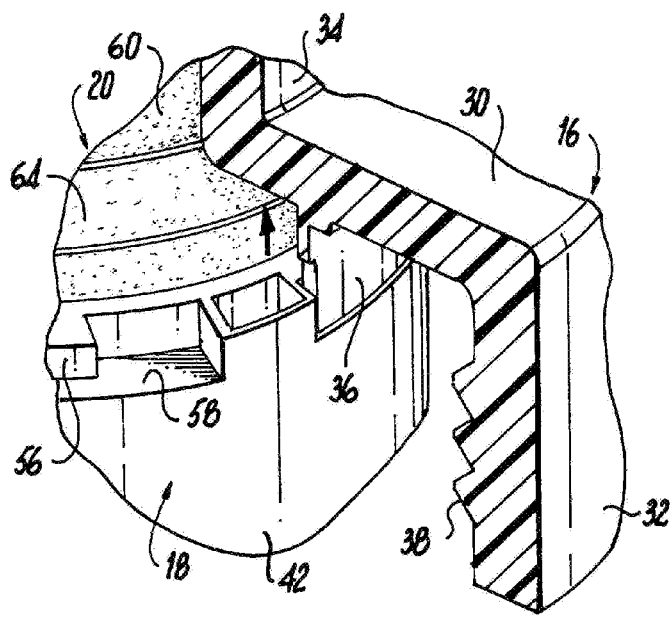

The rotation of filter cartridge 18 relative to cover 16 continues until the engagement lugs 36 abut the end wall of the arcuate access areas 58. Thereupon, as shown in FIG. 10, the downward force on cover 16 is released, allowing the resilient flange portion 64 of spout 20 to decompress. As a result, the cover 16 will be urged in an upward direction and the flange portion 64 will provide a resilient biasing force that promotes the cooperative retention of the engagement lugs 36 of the cover 16 below the engagement ribs 56 of the upper end cap 42 of filter cartridge 18.

Figure 11:
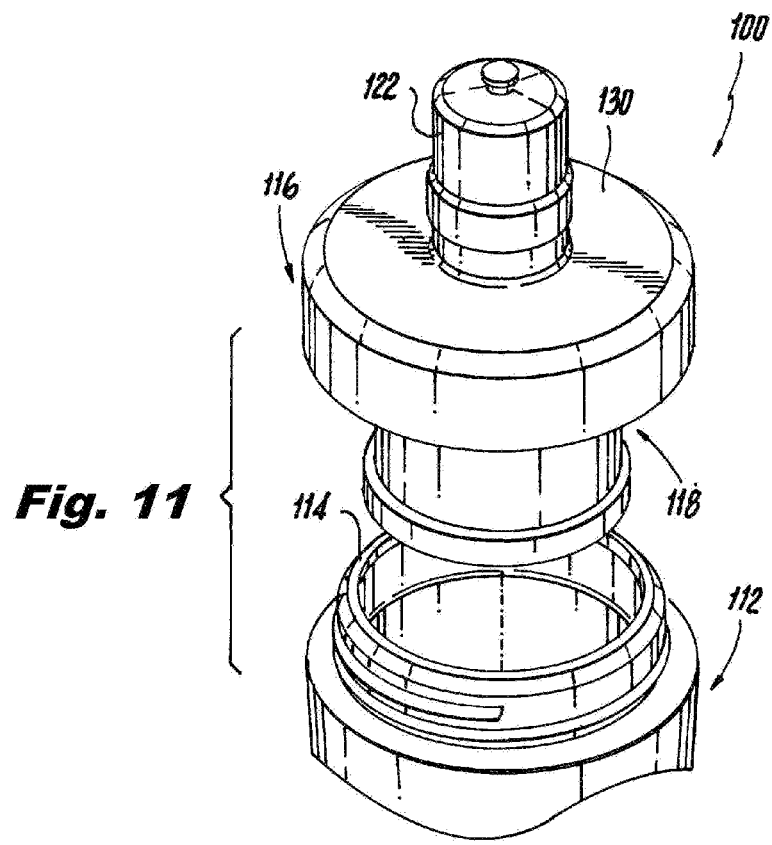
FIG. 11 is a perspective view of another water bottle assembly cover constructed in accordance with a preferred embodiment of the subject invention.

Referring now to FIGS. 11 through 13, there is illustrated another embodiment of the water bottle assembly of the subject invention, which is designated generally by reference numeral 100. Water bottle assembly 100 includes a cylindrical flexible water bottle 112 having an externally threaded opening 114, a cover 116 for cooperating with the externally threaded opening 114 of bottle 112, a replaceable filter cartridge 118 that fits within the opening 114 of bottle 112 and cooperates with the cover 116, and a spout 120 that is in fluid communication with the filter cartridge 118. A frictionally retained cap 122 is operatively associated with the spout 120.

The cover 116 of assembly 100 includes a top wall 130 and a circumferential side wall 132. The top wall 130 of the cover 116 has a central aperture 134 formed therein. In addition, a plurality of circumferentially spaced apart internal engagement lugs 136 depending downwardly from an interior surface of the top wall 130. The circumferential side wall 132 of the cover 116 has an interior thread 138 formed therein for cooperating with the externally threaded opening 114 of bottle 112.

The replaceable filter cartridge 118 is substantially similar filter cartridge 18 described above and it includes a cylindrical filter element 140, an upper end cap 142 and a lower end cap 144. The filter element 140 has an outer periphery 146 and an axial inner bore 148. The upper end cap 142 has an upwardly extending central outlet sleeve 152 that communicates with the spout 120 and downwardly extending inlet sleeve 155 that communicates with the filter element 140.

The upper end cap 142 further includes a circumferential side wall having a plurality of circumferentially spaced apart engagement ribs 156 for cooperating with the circumferentially spaced apart engagement lugs 136 of the cover 116. The spout 120 includes a body portion 160 with an upper nipple section 162, and a circumferential flange portion 164 surrounding the body portion 160. The body portion 160 of spout 120 has a central bore 166 for receiving and accommodating the central outlet sleeve 152 of the upper end cap 142 of filter cartridge 118. The body portion 160 with its upper nipple section 162 extends through the central aperture 134 in the cover 116.

The flange portion 164 of spout 120 is compressible and it is adapted and configured to be positioned between the interior surface of the top wall 130 of the cover 116 and the upper surface 150 of the upper end cap 142 of the filter cartridge 118 to provide a resilient biasing force therebetween. Furthermore, the flange portion 164 of spout 120 includes a plurality of circumferentially spaced apart apertures 165 for accommodating the passage of each the engagement lugs 136 of cover 116, as illustrated in FIG. 13. As best seen in FIG. 12, each of the circumferentially spaced apart engagement lugs 136 has a radially inwardly facing tang 136a for engagement below a corresponding one of the engagement ribs 156. Furthermore, each of the circumferentially spaced apart engagement ribs 156 formed within the upper surface 150 of the upper end cap 142 of filter cartridge 118 resides within an arcuate recess 158 formed in the upper surface 150 of upper end cap 142.

Figure 14:
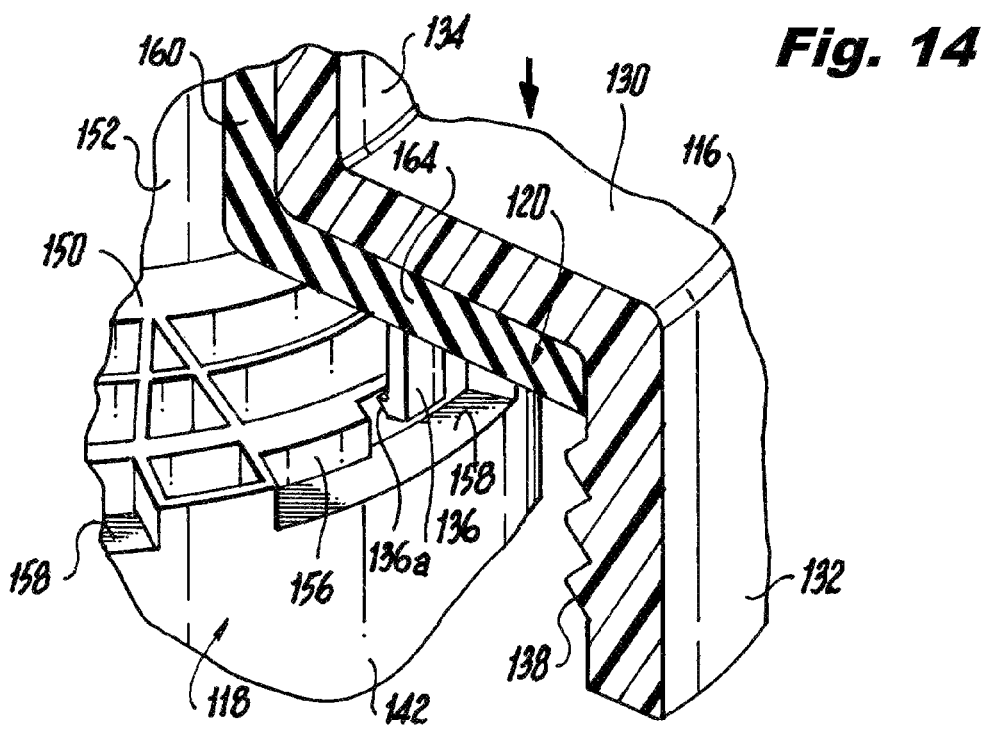
FIGS. 14 through 17 are localized perspective cutaway views of the bottle cover of the water bottle assembly of FIG. 11, illustrating the cooperative interaction between one of the engagement lugs depending from the top wall of the bottle cover and a corresponding rib formed in the peripheral edge of the end cap of the filter cartridge.

Referring now to FIGS. 14 through 17, there is illustrated the sequential steps for securing the replaceable filter cartridge 118 to the cover 116 of the assembly 100. First, as shown in FIG. 14, the body portion 160 of spout 120 is inserted through the central aperture 134 in the top wall 130 of cover 116 so that the circumferentially spaced apart engagement lugs 136 are positioned with corresponding arcuate access areas 158 formed in the upper surface 150 of the upper end cap 142 of cartridge 118.

Figure 15:
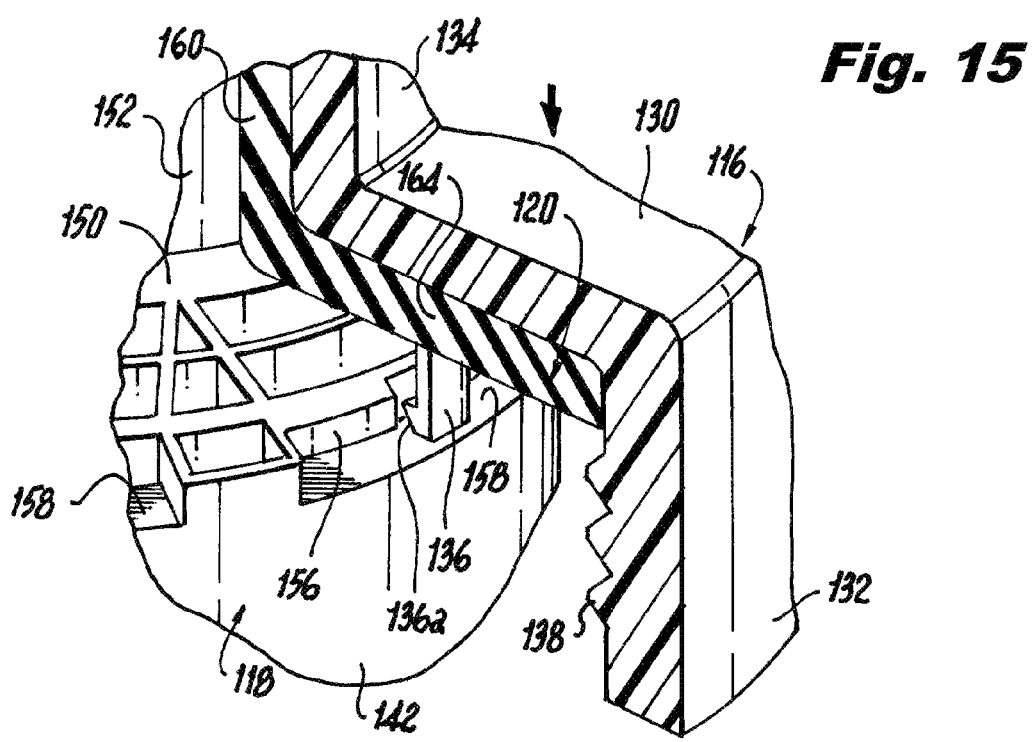
Figure 16:
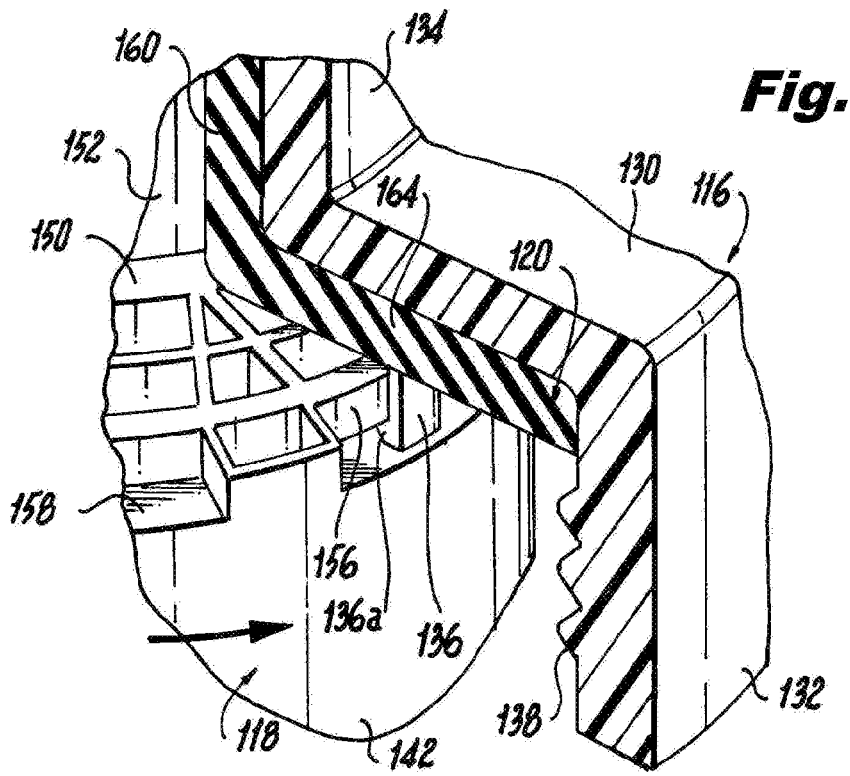

Then, as shown in FIG. 15, a downward force is exerted on the cover 116 to compress the flange portion 164 of spout 120 between the interior surface of the top wall 130 of the cover 116 and the upper surface 150 of the upper end cap 142 of the filter cartridge 118. Thereafter, as shown in FIG. 16, the filter cartridge 118 is rotated relative to the cover 116 so that the radially inwardly facing tangs 136a of the circumferentially spaced apart engagement lugs 136 travel below the corresponding engagement ribs 156 formed in the upper surface 150 of the upper end cap 142 of cartridge 118.

Figure 17:
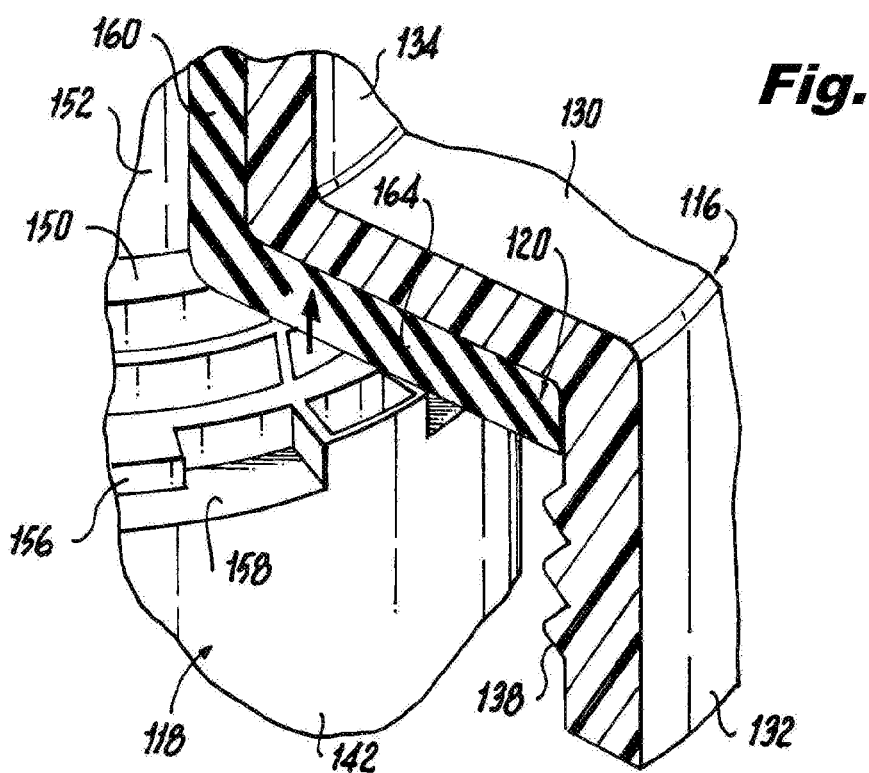

The rotation of filter cartridge 118 relative to cover 116 continues until the engagement lugs 136 abut the end wall of the arcuate access areas 158. Thereupon, as shown in FIG. 17, the downward force on cover 116 is released, allowing the resilient flange portion 164 of spout 120 to decompress. As a result, the cover 116 will be urged in an upward direction and the flange portion 164 will provide a resilient biasing force that promotes the cooperative retention of the engagement lugs 136 of cover 116 and corresponding engagement ribs 156 of the filter cartridge 118.

While the water bottle assembly of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A portable bottle for filtering drinking water comprising:
   a) a bottle having a threaded opening;
   b) a cover for cooperating with the threaded opening of the bottle and including a top wall having a plurality of circumferentially spaced apart internal engagement lugs depending downwardly from an interior surface of the top wall;
   c) a replaceable filter cartridge including an end cap having a circumferential side wall that includes a plurality of circumferentially spaced apart engagement ribs for cooperating with the circumferentially spaced apart engagement lugs of the cover; and
   d) a spout including a compressible circumferential flange configured to be positioned between the interior surface of the top wall of the cover and the upper surface the end cap of the filter cartridge to provide a resilient biasing force therebetween.

2. A portable bottle for filtering drinking water as recited in claim 1, wherein the bottle has an externally threaded opening.

3. A portable bottle for filtering drinking water as recited in claim 2, wherein the cover has a circumferential side wall having an interior thread formed therein for cooperating with the externally threaded opening of the bottle.

4. A portable bottle for filtering drinking water as recited in claim 1, wherein the top wall of the cover has a central aperture formed therein.

5. A portable bottle for filtering drinking water as recited in claim 4, wherein the spout has a nipple configured to extend through the central aperture in the cover.

6. A portable bottle for filtering drinking water as recited in claim 1, wherein the filter cartridge has an outer periphery and an axial inner bore.

7. A portable bottle for filtering drinking water as recited in claim 6, wherein the end cap of the filter cartridge has an upper surface with an upwardly extending central outlet sleeve communicating with the inner bore of the filter element.

8. A portable bottle for filtering drinking water as recited in claim 7, wherein the spout includes a nipple adapted to receive the outlet sleeve of the end cap.

9. A portable bottle for filtering drinking water as recited in claim 1, wherein each engagement lugs has a radially inwardly facing tang for engagement below a corresponding one of the engagement ribs.

10. A portable bottle for filtering drinking water as recited in claim 1, wherein each of the circumferentially spaced apart engagement ribs resides within an arcuate recess formed in the end cap of the filter cartridge.

11. A portable bottle for filtering drinking water comprising:
    a) a bottle having an externally threaded opening;
    b) a cover for cooperating with the externally threaded opening of the bottle and including a top wall and a circumferential side wall, the top wall of the cover having a central aperture formed therein and having a plurality of circumferentially spaced apart internal engagement lugs depending downwardly from an interior surface of the top wall, the circumferential side wall of the cover having an interior thread formed therein for cooperating with the externally threaded opening of the bottle;
    c) a replaceable filter cartridge including a cylindrical filter element and an end cap, the filter element having an outer periphery and an axial inner bore, the end cap of the filter cartridge having an upper surface with an upwardly extending central outlet sleeve communicating with the inner bore of the filter element and a circumferential side wall having a plurality of circumferentially spaced apart engagement ribs for cooperating with the circumferentially spaced apart engagement lugs of the cover; and d) a spout having a nipple configured to extend through the central aperture in the cover and adapted to receive the outlet sleeve of the end cap of the filter cartridge, the spout further including a compressible circumferential flange surrounding the nipple and configured to be positioned between the interior surface of the top wall of the cover and the upper surface the end cap of the filter cartridge to provide a resilient biasing force therebetween, that promotes the cooperative retention of the engagement lugs of the cover below the engagement ribs of the end cap.

12. A portable bottle for filtering drinking water as recited in claim 11, wherein each engagement lug has a radially inwardly facing tang for engagement below a corresponding one of the engagement ribs.

13. A portable bottle for filtering drinking water as recited in claim 11, wherein each of the circumferentially spaced apart engagement ribs resides within an arcuate recess formed in the end cap of the filter cartridge.

14. A portable bottle for filtering drinking water as recited in claim 11, wherein the engagement lugs extend through corresponding apertures formed in the circumferential flange of the spout.

15. A portable bottle for filtering drinking water comprising:

a) a bottle having an opening;
b) a cover for the opening of the bottle including a top wall having a plurality of engagement lugs depending downwardly therefrom;
c) a filter cartridge including an end cap having a circumferential side wall that includes a plurality of engagement ribs for cooperating with the engagement lugs of the cover; and
d) a compressible flange positioned between the top wall of the cover and the end cap of the filter cartridge to provide a resilient biasing force therebetween.

16. A portable bottle for filtering drinking water as recited in claim 15, wherein the bottle has an externally threaded opening and the cover includes a circumferential side wall having an interior thread formed therein for cooperating with the externally threaded opening of the bottle.

17. A portable bottle for filtering drinking water as recited in claim 15, wherein the cover includes a top wall from which the engagement lugs depend.

18. A portable bottle for filtering drinking water as recited in claim 15, wherein the end cap of the filter cartridge has a circumferential side wall in which the engagement ribs are defined.

19. A portable bottle for filtering drinking water as recited in claim 15, wherein the compressible flange surrounds a spout that extends through a central aperture in the cover of the bottle.

20. A portable bottle for filtering drinking water as recited in claim 19, wherein the spout communicates with an outlet sleeve extending upwardly from the end cap of the filter cartridge.

* * * * *